(12) United States Patent
Hochstedler et al.

(10) Patent No.: US 8,818,284 B2
(45) Date of Patent: Aug. 26, 2014

(54) DYNAMIC SPECTRUM ACCESS FOR NETWORKED RADIOS

(75) Inventors: Jeremy H. Hochstedler, Fort Wayne, IN (US); James E. Hardin, Fort Wayne, IN (US); Brian W. Snodgrass, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 514 days.

(21) Appl. No.: 13/206,959

(22) Filed: Aug. 10, 2011

(65) Prior Publication Data

US 2013/0040577 A1 Feb. 14, 2013

(51) Int. Cl.
*H04B 15/00* (2006.01)
*H04B 17/00* (2006.01)
*H04W 16/14* (2009.01)

(52) U.S. Cl.
CPC .................................... *H04W 16/14* (2013.01)
USPC .......................................................... 455/62

(58) Field of Classification Search
CPC .................................................... H04W 16/14
See application file for complete search history.

(56) References Cited

U.S. PATENT DOCUMENTS

| | | | | |
|---|---|---|---|---|
| 5,375,123 A | * | 12/1994 | Andersson et al. | 370/333 |
| 5,655,217 A | * | 8/1997 | Lemson | 455/513 |
| 6,751,444 B1 | * | 6/2004 | Meiyappan | 455/69 |
| 2005/0032485 A1 | * | 2/2005 | Bachman et al. | 455/114.2 |
| 2009/0290552 A1 | | 11/2009 | Bertorelle | |
| 2010/0020760 A1 | | 1/2010 | Grandblaise et al. | |
| 2010/0075704 A1 | | 3/2010 | McHenry et al. | |
| 2010/0105332 A1 | * | 4/2010 | McHenry et al. | 455/62 |
| 2010/0123618 A1 | | 5/2010 | Martin et al. | |

FOREIGN PATENT DOCUMENTS

CN 101 150 790 A 3/2008

OTHER PUBLICATIONS

Notification of Transmittal of the International Search Report and the Written Opinion of the International Searching Authority from corresponding PCT/US2012/049705 mailed Nov. 30, 2012.
Srikanth Pagadarai et al., "On non-contiguous multicarrier waveforms for spectrally opportunistic congnitive radio systems", Waveform Diversity and Design Conference (WDD), 2010 International, IEEE, Piscataway, NJ, USA, Aug. 8, 2010, pp. 177-181, XP031768812, ISBN: 978-1-4244-8202-3.

* cited by examiner

*Primary Examiner* — Yuwen Pan
*Assistant Examiner* — Ayodeji Ayotunde
(74) *Attorney, Agent, or Firm* — Lando & Anastasi, LLP

(57) ABSTRACT

A dynamic spectrum access method for cooperative wireless devices. In one example, a method of establishing a wireless network includes scanning and analyzing a selected frequency band to detect non-cooperative signals within the selected frequency band, determining whether a waveform including one or more radio frequency (RF) carriers and a plurality of intermodulation tones (for multi-carrier waveforms) can be placed within the selected frequency band without interfering with any detected non-cooperative signals, and selecting transmit frequencies for the plurality of RF carriers responsive to obtaining a non-interfering waveform placement solution.

20 Claims, 12 Drawing Sheets

DYNAMIC SPECTRUM ACCESS FOR NETWORKED RADIOS

BACKGROUND

Due to an increasing demand for wireless communications with high data rates, which require high bandwidth, and the limited availability of radio frequency (RF) spectrum, techniques have been developed to dynamically allocate and de-allocate the RF spectrum within high-usage bands. These techniques are referred to as dynamic spectrum access, and allow users to communicate on an ad hoc basis without waiting for a particular frequency band and time slot to be allocated to them. A significant problem in spectrum usage is finding sufficiently large contiguous available bandwidth such that a single RF carrier can be used to accommodate the data rate desired by the user. To address this problem, one approach is to split the user's information/data over multiple RF carriers, thereby achieving an instantaneous bandwidth that is several times larger than the total bandwidth occupied with information. This allows both accommodation of a high data rate and the carriers to be strategically placed within a given transmit/receive spectrum allocated to the user's radio, while avoiding existing RF emitters.

SUMMARY OF INVENTION

Aspects and embodiments are directed to a dynamic spectrum access methodology that allows networked RF devices (e.g., radios) to establish networks within a given RF frequency band (also referred to as spectrum), while avoiding interference with existing RF signals within the same spectrum. Embodiments of the dynamic spectrum access method provide techniques to allow independent entities ("nodes") with no a-priori knowledge of existing networks to construct and reconstruct network links. This methodology brings cognitive abilities to tactical wireless data links by detecting potentially interfering RF signals and automatically reallocating unused or recently freed RF spectrum, as discussed in more detail below.

According to one embodiment, a method of establishing a wireless network comprises scanning and analyzing a selected frequency band to detect non-cooperative signals within the selected frequency band, determining whether a waveform including a plurality of radio frequency (RF) carriers and a plurality of intermodulation tones can be placed within the selected frequency band without interfering with any detected non-cooperative signals, selecting transmit frequencies for the plurality of RF carriers responsive to obtaining a non-interfering waveform placement solution, and transmitting the waveform using the selected transmit frequencies to establish the wireless network.

In one example of the method, determining whether the waveform can be placed within the selected frequency band includes selecting a first frequency for one of the plurality of RF carriers, and evaluating interference with the any detected non-cooperating signals based on placing the waveform with the one of the plurality of RF carriers transmitted at the first frequency. In another example, determining whether the waveform can be placed within the selected frequency band includes selecting a first frequency for a first intermodulation tone of the plurality of intermodulation tones, selecting a second frequency for a second intermodulation tone of the plurality of intermodulation tones, and evaluating interference with the any detected non-cooperating signals based on placing the waveform with the first intermodulation tone located at the first frequency and the second intermodulation tone located at the second frequency.

According to one example, the plurality of RF carriers consists of two RF carriers, and the first intermodulation tone is a fifth-order intermodulation tone and the second intermodulation tone is a third-order intermodulation tone. In one example, selecting the first frequency for the first intermodulation tone includes placing the first intermodulation tone to the right of a first detected non-cooperative signal, the first detected non-cooperative signal having a lowest frequency of the any detected non-cooperative signals. Selecting the second frequency for the second intermodulation tone may include determining whether the second intermodulation tone can be accommodated in a location to the right of the first non-cooperative signal and to the left of a next non-cooperative signal, placing the second intermodulation tone to the right of the first intermodulation tone responsive to determining that the second intermodulation tone can be accommodated in the location, and placing the second intermodulation tone to the right of a next non-cooperative signal where there exists a gap sufficient to maintain a minimum channel spacing between the second intermodulation tone and the any detected non-cooperative signals responsive to determining that the second intermodulation tone cannot be accommodated in the location. In another example, the method further includes iteratively repeating selecting the first frequency and selecting the second frequency responsive to the evaluating interference step revealing that placing the waveform with the first intermodulation tone at the first frequency and the second intermodulation tone at the second frequency would result in interference with the any detected non-cooperative signals.

The method may further comprise reducing a number of RF carriers in the plurality of RF carriers in the waveform responsive to determining that the waveform can not be placed within the selected frequency band without interfering with the any detected non-cooperative signals. In one example the plurality of RF carriers consists of two RF carriers and reducing the number of RF carriers in the plurality of RF carriers includes reducing the number to one RF carrier. In another example, the method further comprises placing the one RF carrier at a frequency within the selected frequency band where the one RF carrier does not interfere with the any detected non-cooperative signals, and transmitting the one RF carrier at the frequency. In one example placing the one RF carrier includes selecting the frequency within a largest frequency spacing between any two of the any detected non-cooperative signals.

Another embodiment is directed to a wireless device configured to implement a dynamic spectrum access method, the wireless device comprising a transmitter configured to transmit a waveform, and a controller coupled to the transmitter and configured to direct the wireless device to scan a selected frequency band, analyze the selected frequency band responsive to the scan to detect non-cooperative signals within the selected frequency band, determine whether the waveform including a plurality of radio frequency (RF) carriers and a plurality of intermodulation tones can be placed within the selected frequency band without interfering with any detected non-cooperative signals, and select transmit frequencies for the plurality of RF carriers responsive to obtaining a non-interfering waveform placement solution.

In one example, the controller is further configured to select a first frequency for a first intermodulation tone of the plurality of intermodulation tones, select a second frequency for a second intermodulation tone of the plurality of intermodulation tones, and evaluate interference with the any detected non-cooperating signals based on the wireless device transmitting the waveform with the first intermodulation tone located at the first frequency and the second intermodulation tone located at the second frequency. In another example, the plurality of RF carriers consists of two RF carriers, and wherein the first intermodulation tone is a fifth-order intermodulation tone and the second intermodulation tone is a third-order intermodulation tone. The wireless device may be a radio, for example. The wireless device may further comprise a user interface, wherein the controller is configured to direct the user interface to display the non-interfering waveform placement solution for selection by the user. In one example, the controller is further configured to reduce a number of RF carriers in the plurality of RF carriers in the waveform responsive to determining that the waveform can not be placed within the selected frequency band without interfering with the any detected non-cooperative signals.

According to another embodiment, a method of dynamic spectrum access comprises scanning a frequency band to detect non-cooperative signals within the frequency band, and determining at least one waveform placement solution to place a radio frequency (RF) waveform within the frequency band without any waveform segments of the RF waveform interfering with any detected non-cooperative signals, including selecting a first configuration of the RF waveform that includes a plurality of waveform segments including at least two RF carriers and a plurality of intermodulation tones, evaluating interference between the plurality of waveform segments and the any detected non-cooperative signals and providing an interference report, and providing a waveform placement solution corresponding to the first configuration of the RF waveform responsive to the interference report indicating no interference between the plurality of waveform segments and the any detected non-cooperative signals, the waveform placement solution including a transmit frequency of the at least two RF carriers.

In one example, the method further comprises selecting a second configuration of the RF waveform responsive to the interference report indicating interference between a waveform segment of the plurality of waveform segments and any one of the any detected non-cooperative signals, the second configuration of the RF waveform including at least one waveform segment, and evaluating interference between the at least one waveform segment and the any detected non-cooperative signals. The method may further comprise receiving a user input, and selecting at least one of the first and second configurations of the RF waveform responsive to the user input.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
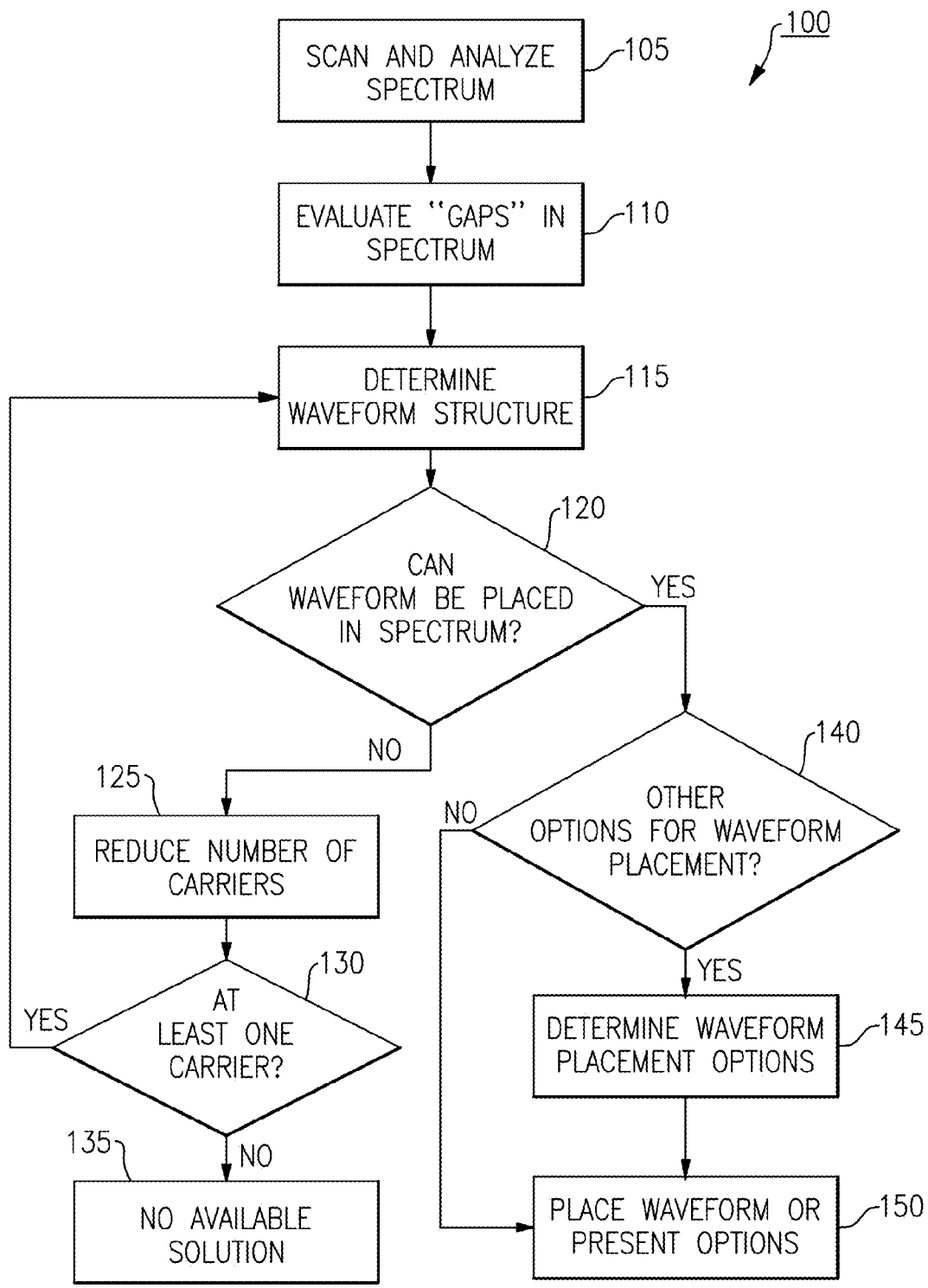
FIG. 1 is a flow diagram illustrating one example of a process for establishing a network according to aspects of the invention.

As discussed above, one mechanism by which to increase the data rate of communications over wireless RF links is to use multiple RF carriers per transmission. A drawback to this approach is that the multiple RF carriers create intermodulation tones from the mixing of the multiple carriers in the power amplifier stage of a radio. These intermodulation tones are then present in the output transmission waveform and can interfere with existing RF signals; a highly undesirable result. Presently, efforts are focused on eliminating (or greatly reducing the amplitude of) the third-order and fifth-order intermodulation tones produced by non-linear power amplifiers. Existing dynamic spectrum access techniques do not account for the possible presence of intermodulation tones.

Accordingly, aspects and embodiments are directed to a network discovery and dynamic spectrum access methodology that accounts for intermodulation tones when attempting to place a waveform within a particular band of RF spectrum. According to one embodiment, a wireless device ("node") scans and analyzes the selected RF spectrum (that is, a range of frequencies corresponding to or within the node's operating frequency range) to detect existing RF emitters within the spectrum, and determines one or more options for placing the waveform within the spectrum such that the waveform (including intermodulation tones for multi-carrier waveforms) does not interfere with any of the existing RF emitters. In one example, where multiple options for placing the waveform in the designated spectrum exist, the user may select a preferred option. The methodology may further include dynamically altering the number of carriers in the waveform, depending for example on the available space in the selected RF spectrum, to determine a waveform that can be placed in the RF spectrum without interfering with existing RF emitters, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, there is illustrated a flow diagram of one example of a process for establishing a network, including placing a communications waveform in a non-interfering location in a selected portion of the RF spectrum. The process 100 may be implemented as a computer-executable program running on one or more commercially available processors, such as processors manufactured by Texas Instruments, Intel, AMD, Sun, IBM, Motorola, Freescale and ARM Holdings. However, the process may be implemented on any type of processor, field-programmable gate array, multiprocessor or controller, whether commercially available or specially manufactured, that is incorporated into a wireless device and programmed to perform the signal processing and computations discussed herein.

In one embodiment, Step 105 includes scanning and analyzing a frequency band of interest to locate existing RF signals in the band which are not associated with the scanning node or with a network that a user of the scanning node wishes to join. These signals are referred to herein as "non-cooperative signals." In one example, the process uses minimal background processing on a small, low-power (for example, about 5-35 dBm output power, or 27-36 W consumed power) data link to detect these non-cooperative signals and to find transmit frequency locations for the waveform, as discussed further below.

Figure 2:
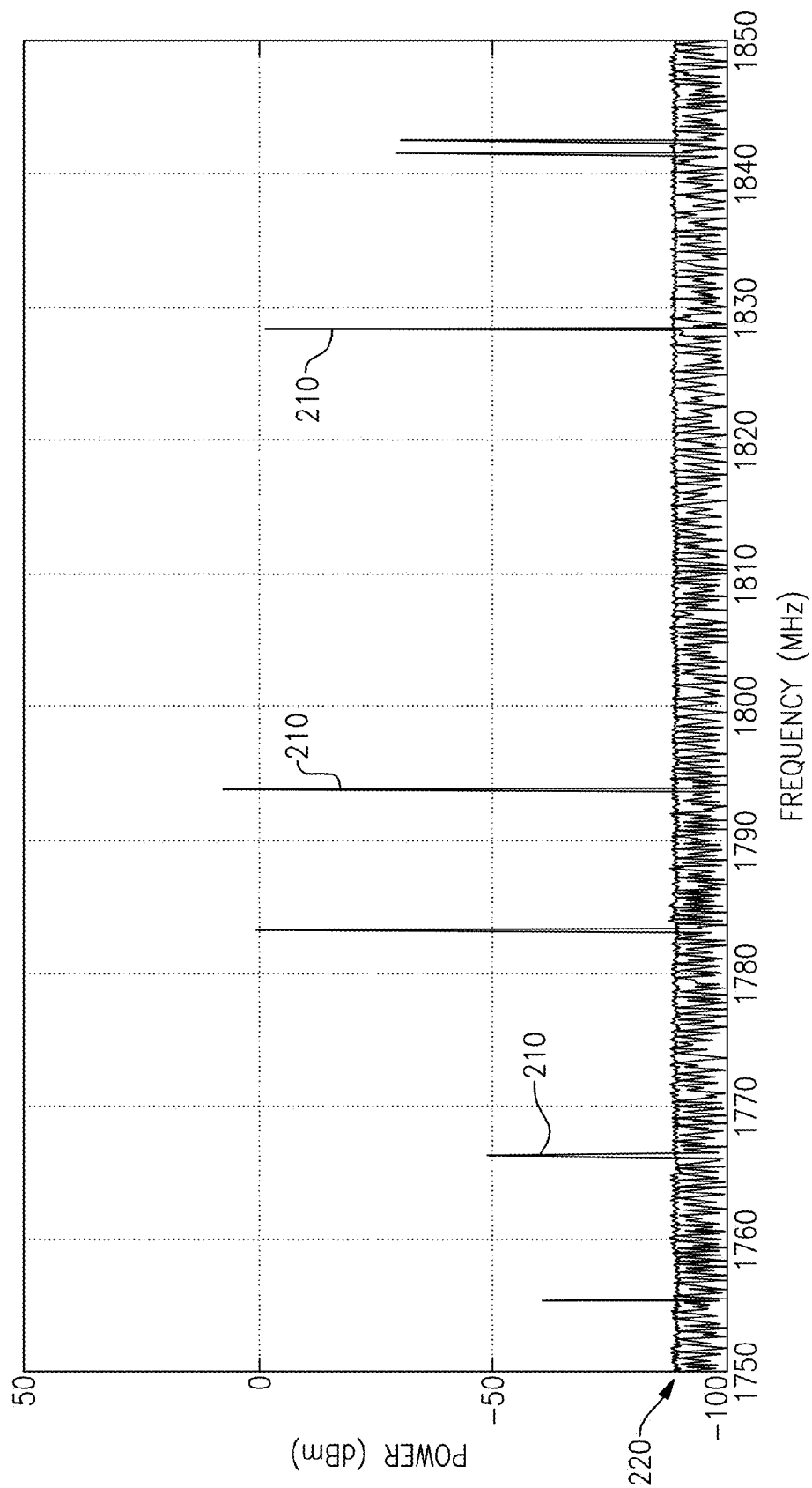
FIG. 2 is a diagram of one example of a portion of a simulated RF spectrum including a plurality of non-cooperative signals.

FIG. 2 illustrates an example of a simulated frequency band containing several non-cooperative signals 210. In FIG. 2, threshold 220 represents the noise floor. In one example, only non-cooperative signals with a power level greater than the noise floor 220 are considered in the waveform-placement process. The example RF spectrum illustrated in FIG. 2 extends from 1750 Megahertz (MHz) to 1850 MHz; however, this example is illustrative only and not intended to be limiting. The range of frequencies scanned may be selected based on any of several factors, including for example, the operating frequency range of the wireless device, known information about frequencies bands likely to have available RF spectrum in which a network can be established, regulations governing spectrum use for particular applications, etc.

In one embodiment, the RF spectrum is analyzed using a signal processor configured to perform Fast Fourier Transforms (FFT's) of the spectrum to detect non-cooperative signals. The signal processor performs numerous FFT's in quick succession to obtain an analysis of the spectrum, for example as illustrated in FIG. 2. Accordingly, the processor may behave as an embedded spectrum analyzer in the wireless device. The spectrum analyzer functions may be performed by a dedicated processor or by the processor configured to perform the overall process 100.

Still referring to FIG. 1, in step 110 the "gaps" in the spectrum, namely the spaces between the detected non-cooperative signals 210, are evaluated to determine which gaps are large enough for a waveform segment (i.e., carrier or intermodulation tone) to be placed therein. In one example, an adjacent channel policy defines the minimum distance, or channel spacing, (in kHz) allowed between a waveform segment and a non-cooperative signal. For example, the minimum channel spacing may be set at 10 kHz or 25 kHz. In one example, the minimum channel spacing may be dynamically configurable by the user of the wireless device. Step 115 includes determining the structure of the waveform to be placed in the spectrum. The waveform structure includes the number of RF carriers, spacing between carriers if there is more than one carrier, and those intermodulation tones generated by multiple carriers that have an amplitude (power level) above a preset threshold level, for example, above the noise floor 220. The process 100 then includes attempting to place the waveform in the selected frequency band and determining whether the waveform can be placed without interfering with any of the non-cooperative signals (step 120). In one example, a waveform segment is considered to interfere with a non-cooperative signal if the minimum channel spacing between the waveform segment and the non-cooperative signal is not achieved.

According to one embodiment, the process 100 may be configured to default to attempting first to place a waveform that uses a maximum number of RF carriers as determined by the communications protocol for which the wireless device is configured. For example, the wireless device may be configured to operate with up to six RF carriers per transmission. Accordingly, in one example, steps 115 and 120 may first be performed based on a waveform that includes six RF carriers. If the waveform cannot be accommodated, the process may include reducing the number of carriers (step 125) and repeating steps 115 and 120. As discussed above, the achievable data rate for wireless transmissions may be higher if more RF carriers are used. Accordingly, it may be preferable to use as many RF carriers as can be accommodated by the spectrum and by the communications protocol of the wireless device. In another example, the initial number of RF carriers used in the waveform may be selected based on, for example, the desired data rate for the transmission and/or user preferences, and may or may not be equal to the maximum number of carriers that can be used under the communications protocol of the wireless device.

Figure 3:
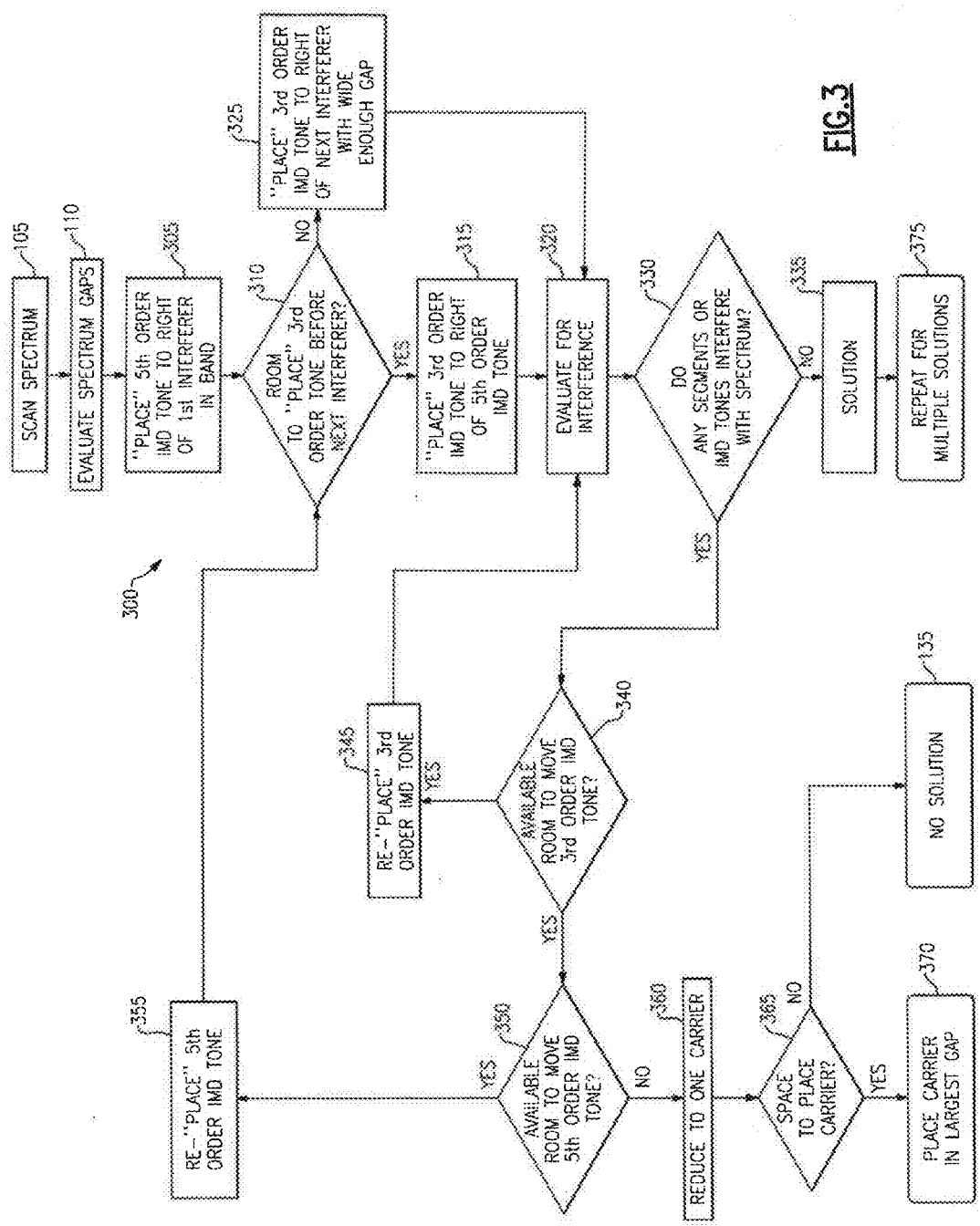
FIG. 3 is a flow diagram illustrating one example of a process of placing a waveform within a selected frequency band according to aspects of the invention.

FIG. 3 illustrates a flow diagram of one example 300 of a process for placing the waveform in the selected frequency band. In the example illustrated in FIG. 3, the waveform initially uses two RF carriers and the power level of the transmission is such that the third-order and fifth-order intermodulation tones are to be considered. However, as will be appreciated by those skilled in the art, given the benefit of this disclosure, this process may be extended to begin with the waveform that includes more than two RF carriers, and/or accounts for additional intermodulation tones. Numerous other variations on the process 300 may also be implemented, as discussed further below.

In one example, the waveform placement process 300 begins (after steps 105 and 110) with a step 305 of placing the fifth-order intermodulation tone to the right of the first (lowest frequency) non-cooperative signal 210 in the selected frequency band. The process may then evaluate whether, given the locations of the other detected non-cooperative signals 210, there is sufficient room to place the third-order intermodulation tone before the next non-cooperative signal (step 310). As known to those skilled in the art, for a spacing (in frequency) of two RF carriers, the intermodulation tones occur at predetermined spacings (in frequency) from each other and from the carriers. If there is sufficient room to accommodate the third-order intermodulation tone, this tone is placed to the right of the fifth-order intermodulation tone (step 315). Since the structure of a two-carrier waveform may be completely determined from any two segments, placement of one pair of fifth-order and third-order intermodulation tones determines the placement in the spectrum of the two carriers as well as the other pair of fifth-order and third-order intermodulation tones. Accordingly, after placement of the first pair of fifth-order and third-order intermodulation tones, the spectrum may be evaluated to determine whether any of the remaining waveform segments interfere with any detected non-cooperative signals (step 320).

Figure 4:
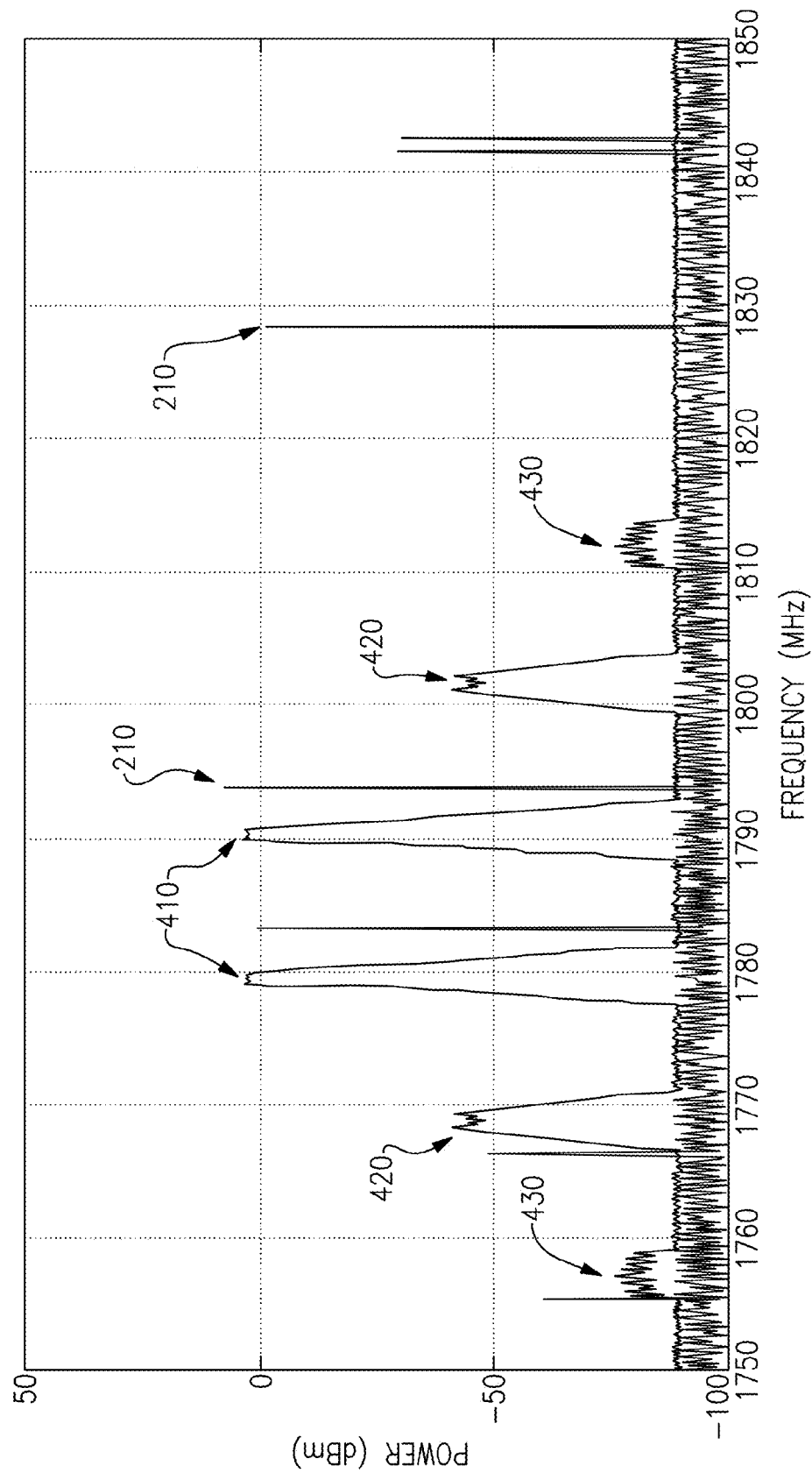
FIG. 4 is a diagram of a portion of a simulated RF spectrum including a plurality of non-cooperative signals and a waveform placed in a non-interfering location within the spectrum according to aspects of the invention.

FIG. 4 illustrates one example of a waveform placed into a selected frequency band with several non-cooperative signals 210. In the illustrated example, the waveform includes two RF carriers 410, third-order intermodulation tones 420 and fifth-order intermodulation tones 430. In this example, each of the waveform segments 410, 420 and 430 is placed in the frequency band such that no segment interferes with any of the non-cooperative signals 210. That is, the specified minimum channel spacing (for example, about 100 kHz or 25 kHz) is maintained between each non-cooperative signal 210 and each waveform segment.

Referring again to FIG. 3, in one example, if the third intermodulation tone cannot be accommodated before the next non-cooperative signal, the third intermodulation tone is placed to the right of the next non-cooperative signal where there exists a large enough gap to maintain the minimum channel spacing between the third intermodulation tone and the non-cooperative signals (step 325). The spectrum is then evaluated for interference in step 320 and an "interference report" that identifies any interference may be generated. As discussed above, analysis of the spectrum may be accomplished by taking a series of FFT's of a received time-domain signal to "build" a view of the spectrum covering the frequency band of interest. Step 330 includes determining whether any of the waveform segments (carriers or intermodulation tones) interfere with any detected non-cooperative signals. If there is no interference, the waveform placement process has determined a "solution" (step 335), namely the frequencies at which the wireless device can transmit each RF carrier without causing interfering with existing RF emitters. In one example, once a solution has been determined, the wireless device may be automatically configured to transmit at the appropriate frequencies.

If the spectrum evaluation steps 320 and 330 reveal that one or more waveform segments will interfere with a non-cooperative signal, the process may attempt to adjust the placement of the waveform to avoid the interference. In one example, this adjustment includes step 340 of evaluating whether there is room to move the third-order intermodulation tone (step 340). If yes, the third-order intermodulation tone may be re-placed (step 345) and the spectrum evaluated for interference based on the new waveform placement (step 320). If there is not sufficient room to move the third-order intermodulation tone, the waveform adjust process may include evaluating whether the fifth-order intermodulation tone can be moved (step 350). If yes, the fifth-order intermodulation tone is re-placed in the spectrum (step 355), followed by updating the placement of the third-order intermodulation tone (steps 310 and either step 315 or 325) and evaluating the spectrum (step 320) based on the new waveform placement.

Figure 5:
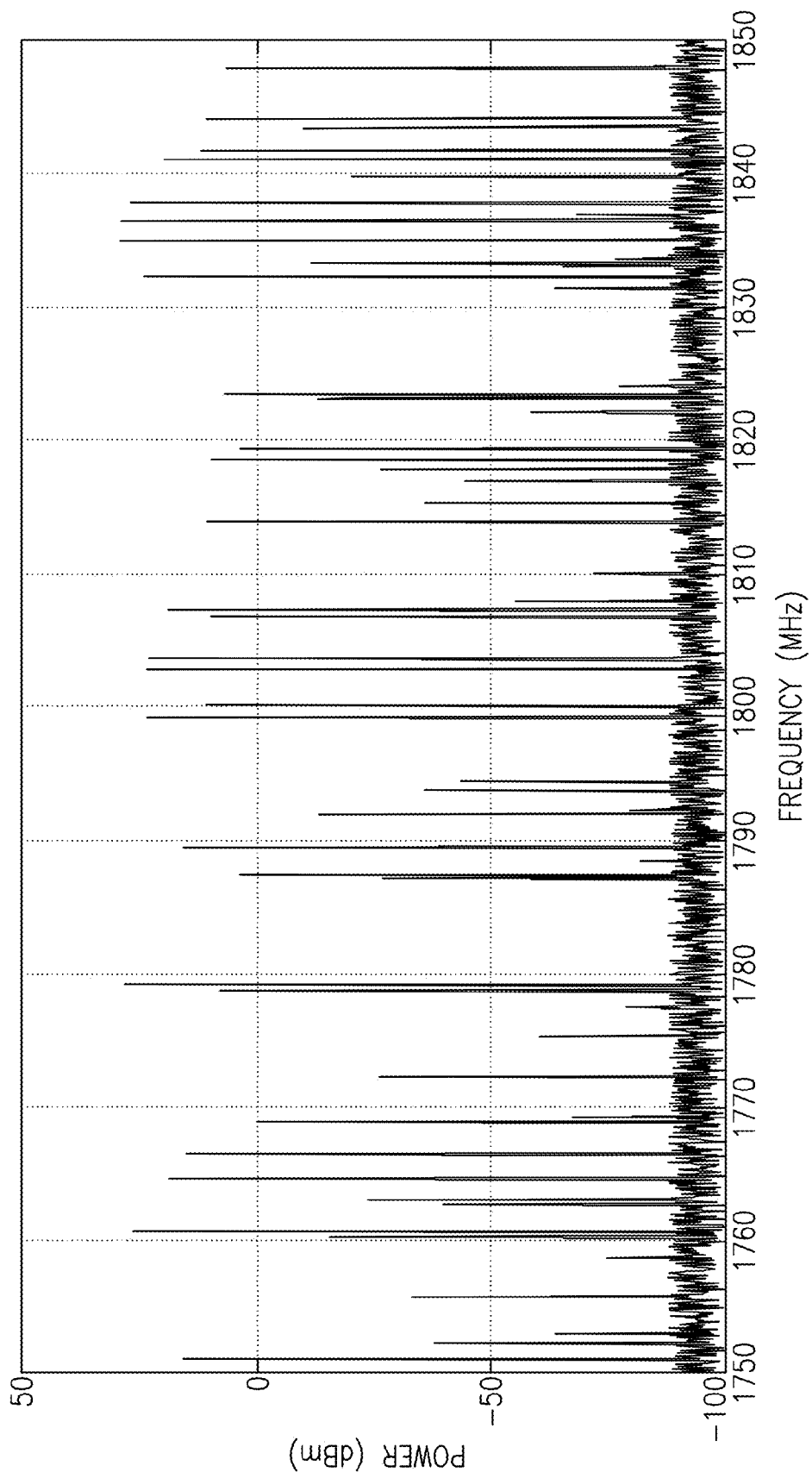
FIG. 5 is a diagram of another example of a portion of a simulated RF spectrum including a plurality of non-cooperative signals.

As discussed above with reference to FIG. 1, if the waveform cannot be placed in the selected frequency band without causing interference with a non-cooperative signal, the number of carriers used in the waveform may be reduced (step 125). Reducing the number of carriers reduces the number of waveform segments to be placed in the spectrum, making it easier to find a non-interfering solution. In the examples illustrated in FIGS. 2 and 4, the spectrum is relatively uncrowded with few non-cooperative signals 201. However, in some circumstances the frequency band in which user needs or wishes to transmit is very crowded with many closely-spaced non-cooperative signals, as illustrated for example, in FIG. 5. In these circumstances, placing a multi-carrier waveform and considering possible interference caused by the intermodulation tones of the waveform may be significantly more challenging. Accordingly, reducing the number of carriers in the waveform (step 125) may be necessary to find a non-interfering solution.

Figure 6:
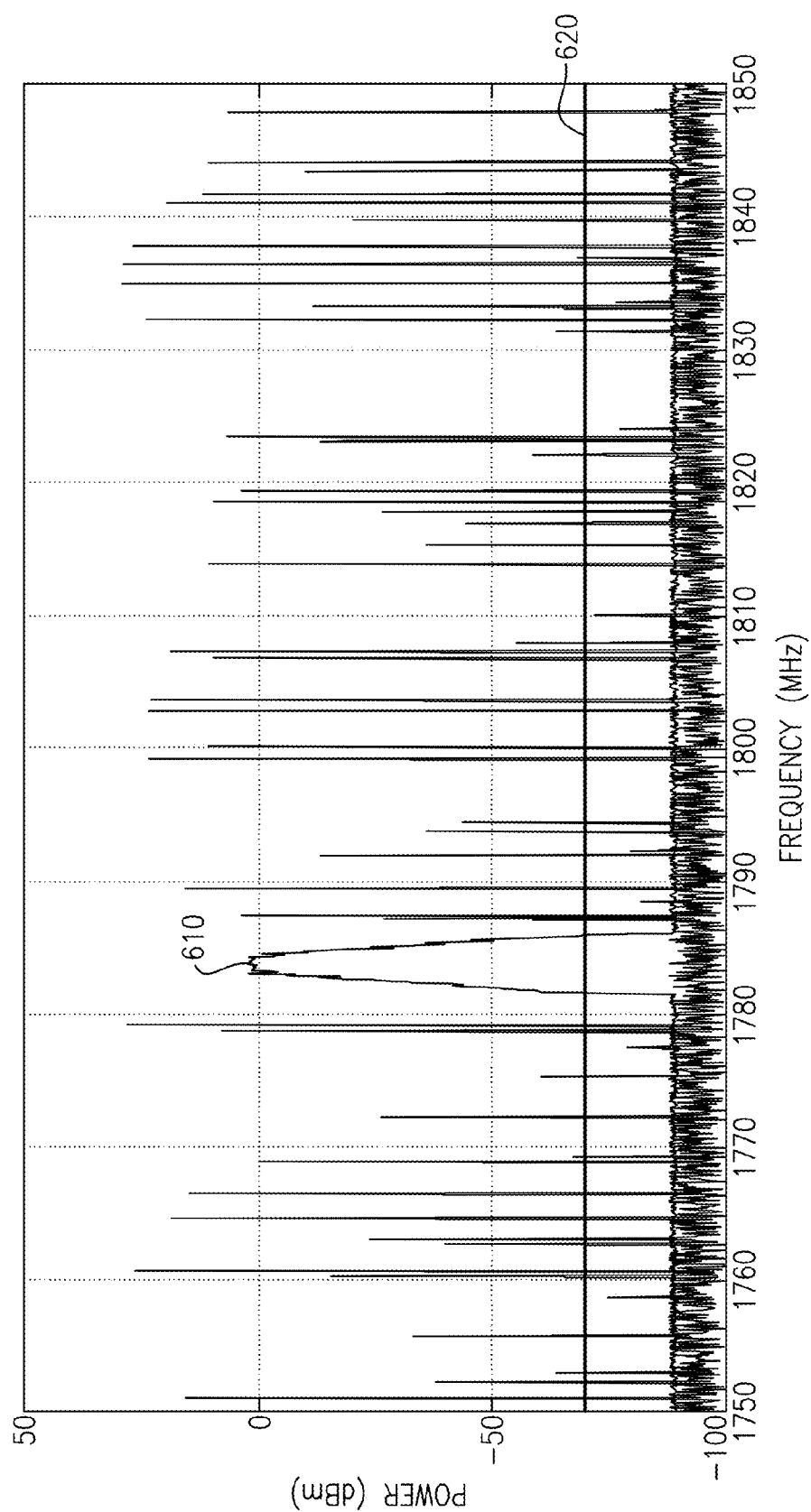
FIG. 6 is a diagram of the portion of a simulated RF spectrum of FIG. 5 including a waveform placed in a non-interfering location within the spectrum according to aspects of the invention.

In the two-carrier example illustrated in FIG. 3, step 125 includes a step 360 of reducing the waveform from two carriers to one carrier. The spectrum may then be evaluated to determine whether there is room to place the single carrier at least the minimum specified channel distance from any non-cooperative signal 210 (step 365). Intermodulation tones arise only for multiple carrier waveforms, and therefore in the single carrier case there is no need to consider possible interference by intermodulation tones. In one example, the single carrier is placed in the largest available gap in the spectrum (step 370), and the wireless device may be automatically configured to transmit at that frequency. FIG. 6 illustrates an example of a single carrier 610 placed in a non-interfering location in the example spectrum of FIG. 5. In one example, only non-cooperative signals having a power level above a certain threshold 620, or noise floor, are considered. This threshold may be dynamically adjusted by a user of the wireless device or systematically adjusted to "force" a waveform placement solution with certain user-defined characteristics. As discussed above, for multi-carrier waveforms, similarly only intermodulation tones above the threshold power level 620 may be taken into account in the waveform placement process. If the single carrier cannot be placed in a non-interfering location in the selected frequency band, the process 100 may include alerting the user of the wireless device that no solution has been found (step 135). The user may then decide whether to transmit and potentially interfere with an existing RF emitter, raise the noise threshold to potentially eliminate some low-power non-cooperative signals and/or low-power intermodulation tones from consideration thereby making it easier to place the waveform, wait until space becomes available in the frequency band, or attempt to use a different frequency band.

As discussed above, in one embodiment, once a solution is found, the wireless device may be automatically configured to transmit using the determined waveform structure and placement. According to another embodiment, the wireless device may be configured to repeat the waveform placement process to attempt to find several solutions. In some circumstances, users of the wireless devices may prefer to be presented with several solutions and given the ability to select which solution to use for transmitting a particular transmission or setting up a particular network. Accordingly, in one embodiment the process 100 includes steps 140 and 145 of determining whether other non-interfering waveform placement solutions are available in the selected frequency band. Thus, the example process 300 illustrated in FIG. 3 may includes a step 375 of repeating the waveform placement process to determine whether other non-interfering solutions exist. In some examples, step 375 may include repeating the waveform placement process using different starting conditions to increase the likelihood of finding different solutions. For example, instead of attempting to place the fifth-order intermodulation tone to the right of the first (lowest frequency) non-cooperative in the frequency band (step 305), the process may attempt to place the other fifth-order intermodulation tone to the left of the last (highest frequency) non-cooperative signal 210 in the band. Other steps in the process 300 may be similarly adjusted. In another example, the process 300 may use the two carriers, or a carrier and one of the intermodulation tones as the base segments for determining waveform placement solutions.

According to various examples, transmitting the carrier(s) of the waveform at the lowest available frequency may provide a benefit in that less power may be used to transmit at lower versus higher frequencies. Therefore, the example waveform placement process 300 illustrated in FIG. 3 attempts first to place the waveform in the lower portion of the selected frequency range. However, the processes 100 and 300 are not so limited and may be configured with any of numerous starting conditions, as discussed above, and any of numerous different methodologies for initially placing and adjusting the various waveform segments. The above-discussed example of FIG. 3 illustrates a two-carrier waveform with third-order and fifth-order intermodulation tones. As discussed above, the waveform may include any number of carriers, not limited to two. In addition, depending on the power level of the transmission and/or the linearity of the power amplifier in the wireless device, more or fewer intermodulation tones may have power levels above the specified threshold 620 and may be considered in the waveform placement process. Thus, the processes discussed above may be adjusted, as would be understood by those skilled in the art given the benefit of this disclosure, to account for the intermodulation tones that are associated with any given transmission waveform. As discussed above, the threshold 620 may be dynamically adjusted by the user of the wireless device. Accordingly, different waveform placement solutions may exist based on different threshold levels (which may include or exclude some intermodulation tones and/or non-cooperative signals). In addition, even if there is no change in the threshold or condition of the selected frequency band (i.e., the number and locations of the non-cooperative signals remains the same from one waveform placement attempt to the next), different solutions may be obtained by using different starting conditions and/or different waveform segments.

Figure 7A:
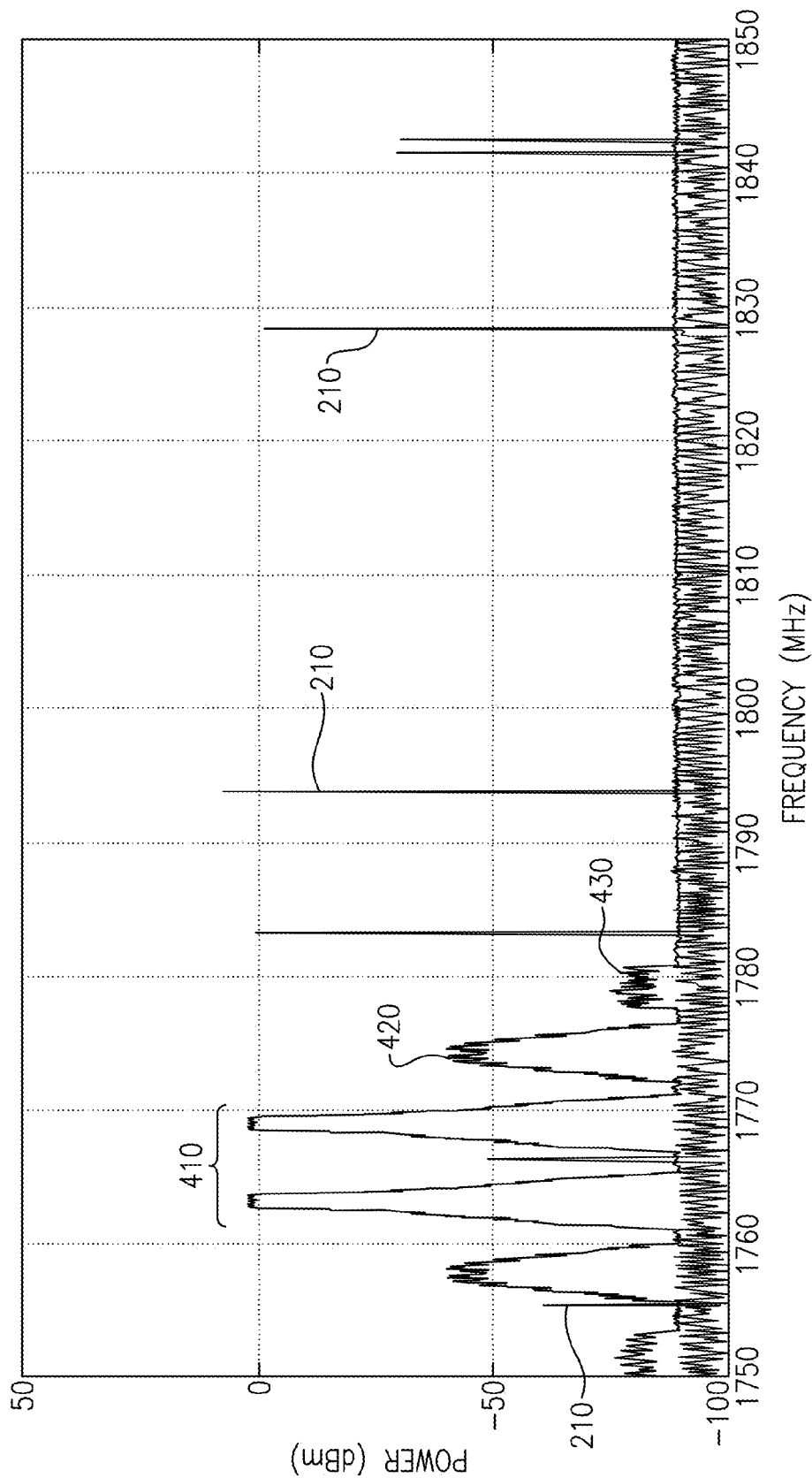
FIG. 7A is a diagram illustrating a first example of a waveform placed in a non-interfering location within the spectrum of FIG. 2, according to aspects of the invention.
Figure 7B:
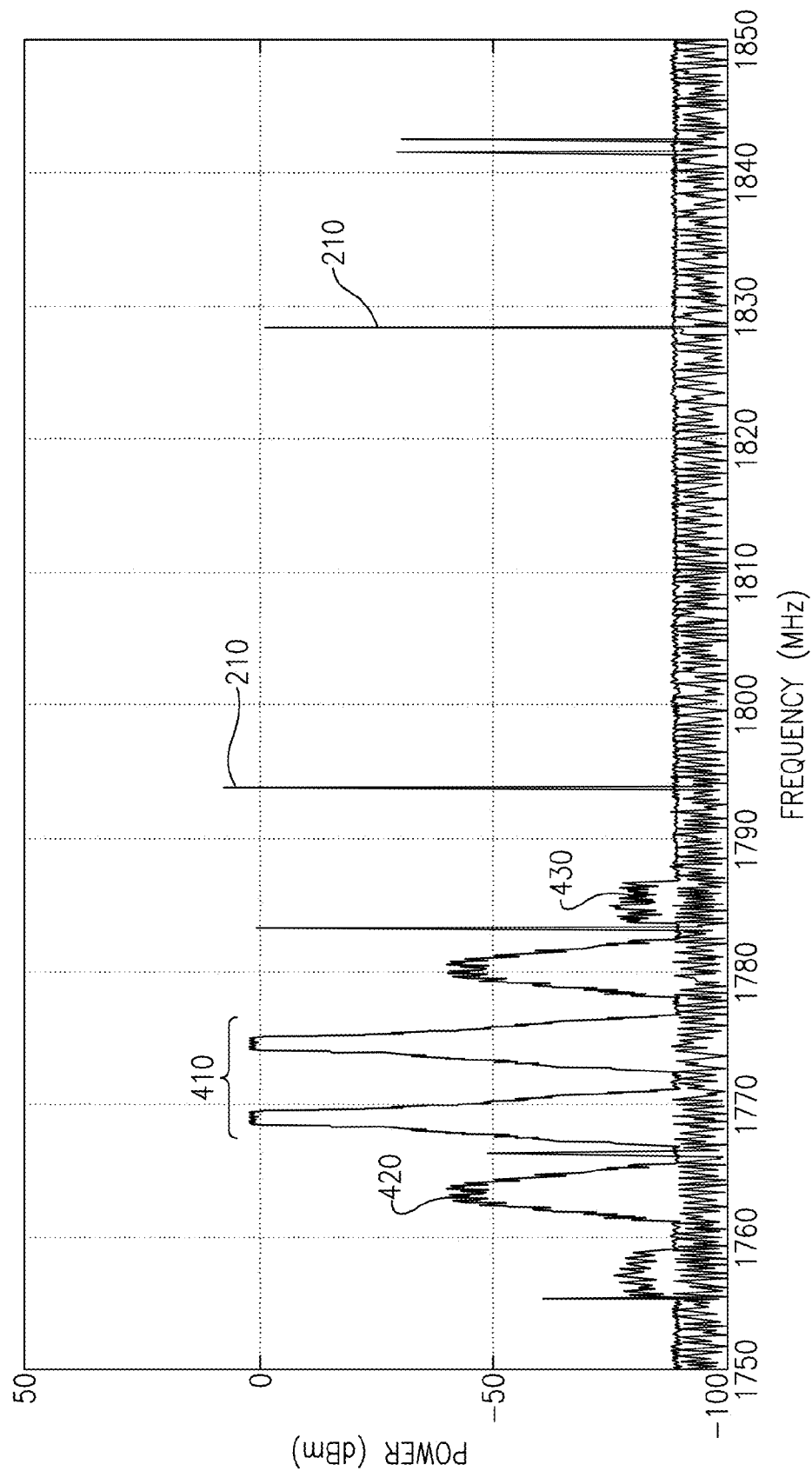
FIG. 7B is a diagram illustrating a second example of the waveform placed in a non-interfering location within the spectrum of FIG. 2, according to aspects of the invention.
Figure 7C:
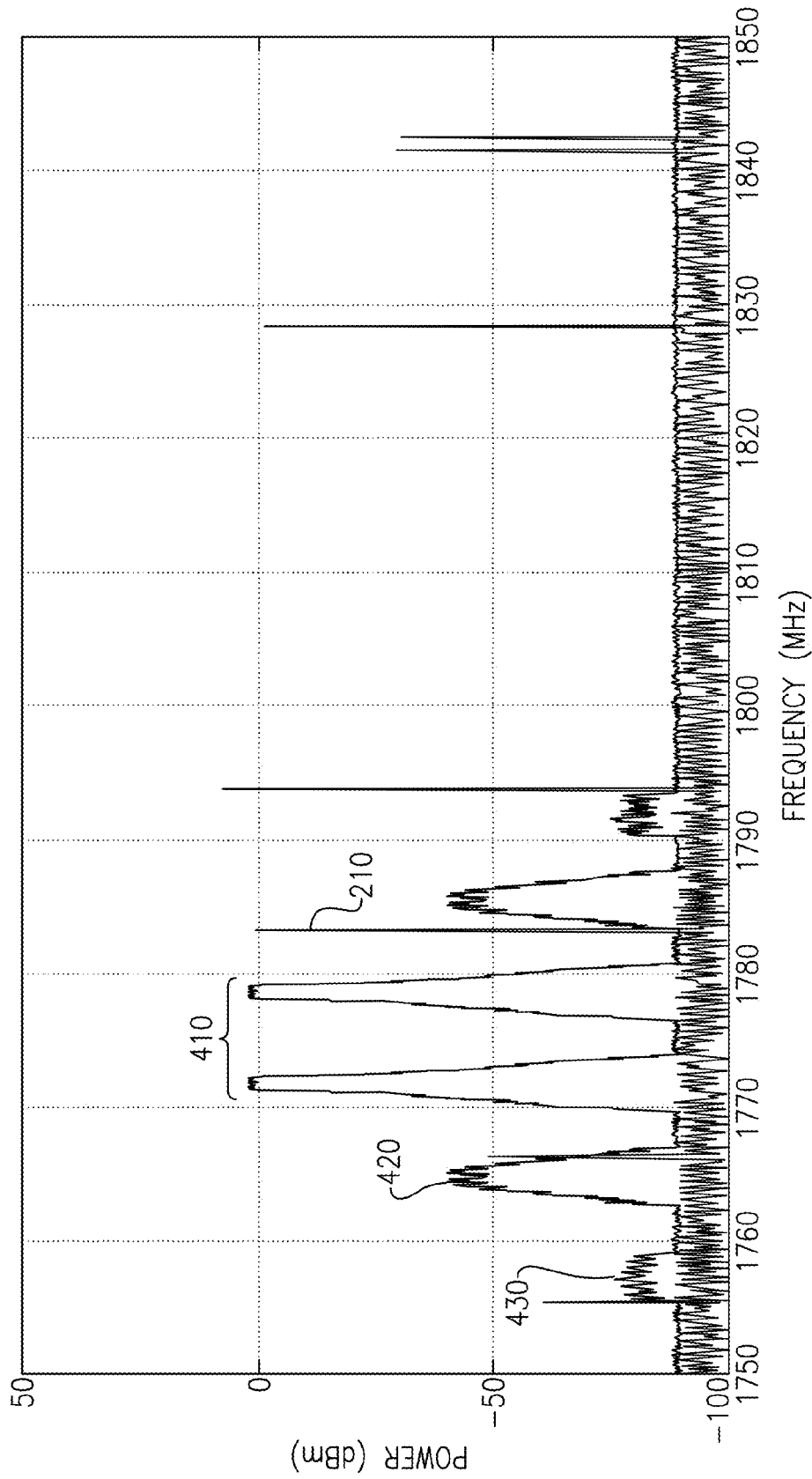
FIG. 7C is a diagram illustrating a third example of the waveform placed in a non-interfering location within the spectrum of FIG. 2, according to aspects of the invention.
Figure 7D:
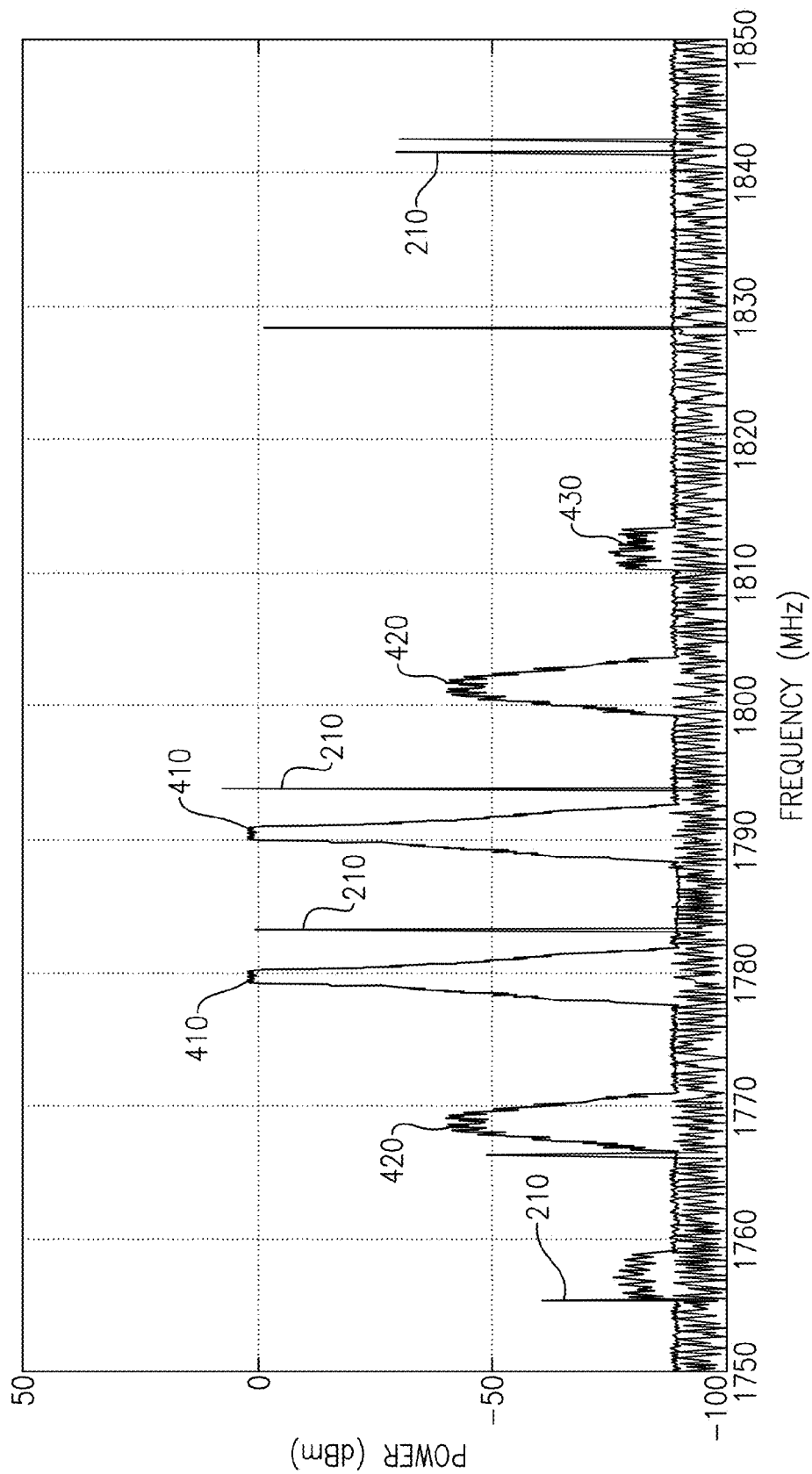
FIG. 7D is a diagram illustrating a fourth example of the waveform placed in a non-interfering location within the spectrum of FIG. 2, according to aspects of the invention.

Referring again to FIG. 1, if multiple non-interfering waveform placement solutions are found, the device may be configured to display the available solutions to the user so that the user can select a preferred solution (step 150). For example, FIGS. 7A-7D illustrate different waveform placement solutions that may be obtained for the spectrum of FIG. 2 and a two-carrier waveform with third-order and fifth-order intermodulation tones considered. In one example, the user may select a particular solution from several options based on knowledge of the spectrum. For example, the user may have knowledge that another non-cooperative signal is likely to appear at a particular location in the spectrum (e.g., through knowledge of pre-scheduled transmissions at certain frequencies) and disrupt a presently non-interfering waveform placement. In another example, it may be preferable to select a solution (either automatically, or manually by the user) in which the waveform segments are closely spaced, for example, as illustrated in FIGS. 7A and 7B. The wireless device may be configured with a variety of "rules" that govern automatic searches for a specified number of waveform placement solutions and/or automatic selection of a waveform placement solution from several options. The wireless device may further be configured to allow the user to program the device for either automatic waveform placement or manual waveform placement in which the user is prompted to select from the available waveform placement options (step 150). Once a waveform placement solution has been selected, the wireless device may be configured to transmit the waveform using the frequencies determined according to the selected waveform placement solution.

Figure 8:
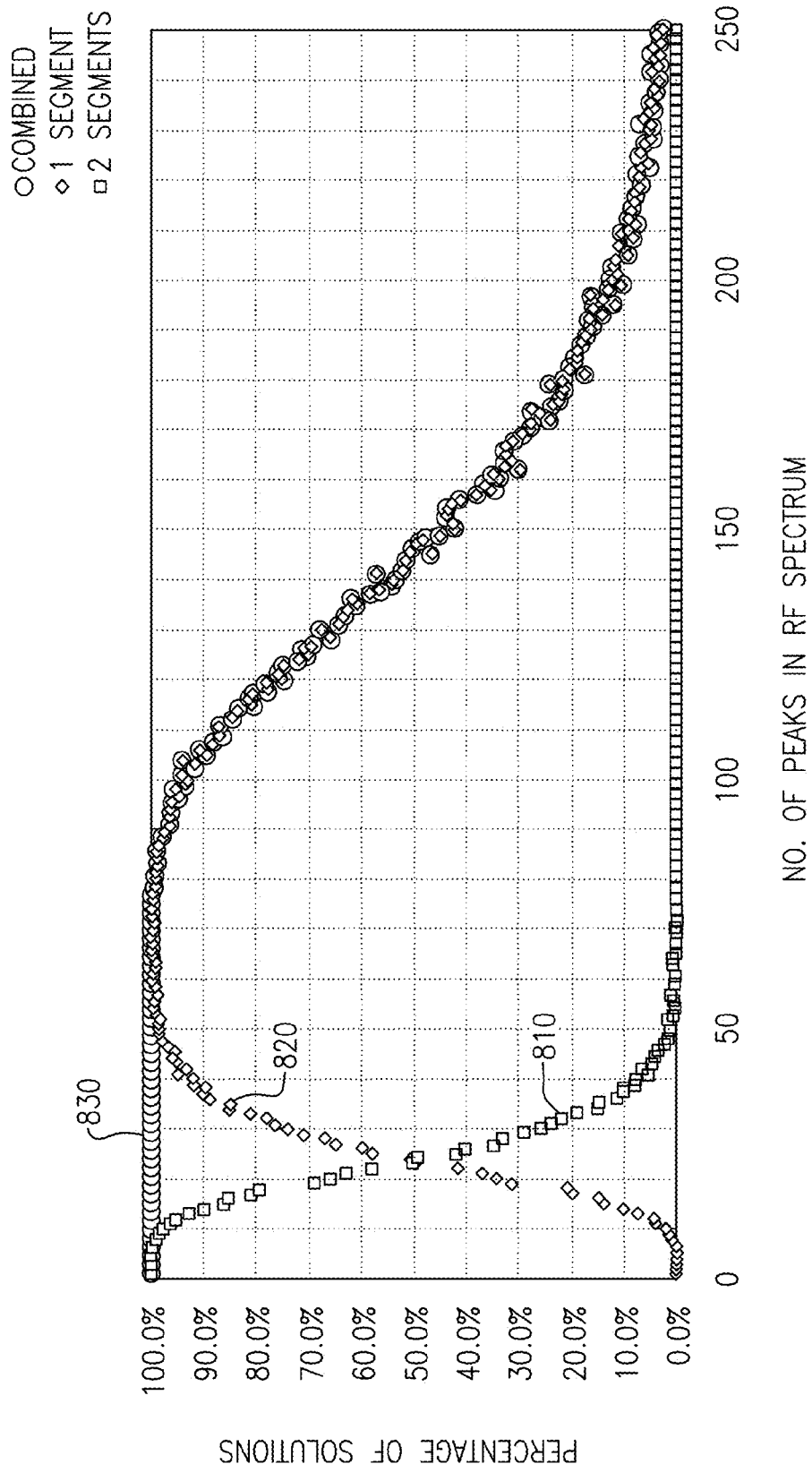
FIG. 8 is a graph illustrating simulation results for an example of a waveform placement process according to aspects of the invention.

Referring to FIG. 8 there is illustrated a graph of simulation results illustrating waveform placement success rates for an example of a waveform placement process as discussed above. The simulation was implemented using the program MATLAB™ available from The Mathworks, Inc. (Natick, Mass.). The simulation was configured to run the waveform placement process based on a two-carrier waveform including third-order and fifth-order intermodulation tones and/or a one-carrier waveform, for an increasing number of non-cooperative signals in a frequency band of 1750 MHz-1850 MHz. In FIG. 8, the number of non-cooperative signals in the spectrum is plotted on the horizontal axis with the percentage success rate of the waveform placement process on the vertical axis. As illustrated in FIG. 8, the waveform placement process was able to place a two-carrier waveform (represented by trace 810) in a non-interfering location in the band with an 80% success rate for up to about 20 non-cooperative signals. For the simulation, the waveform placement process was configured to switch to a one-carrier waveform when a non-interfering waveform placement solution for the two-carrier waveform could not be found, as discussed above. Trace 820 represents waveform placement success for the one-carrier waveform. The success rate for the one-carrier waveform is very low for a low number of non-cooperative signals because in those circumstances that waveform placement process had a very high success rate placing the two-carrier waveform and therefore did not need to switch to the one-carrier waveform in most instances. Trace 830 represents the combination of success in placing either a two-carrier or one-carrier waveform. As can be seen with reference to FIG. 8, the waveform placement process was able to place a waveform in a non-interfering location with approximately a 100% success rate with up to about 77 non-cooperative signals in the band.

Thus, embodiments of the waveform placement process discussed herein provide for a dynamic spectrum access technique that accounts for interference caused not only by the RF carrier segment(s) of the waveform, but also by the associated intermodulation tones of a multi-carrier waveform. As discussed above, the waveform placement process is dynamically configurable and may automatically adjust the number of RF carriers used in the waveform to attempt to optimally place the waveform in a non-interfering location within the specified RF frequency band. Additionally, a user may adjust parameters such as the minimum permitted channel spacing, and the noise threshold, as discussed above, to improve waveform placement options. Successful waveform placement without interference may be critical to effectively communicating in a specified RF frequency band, and embodiments of the processes discussed herein provide mechanisms for achieving successful, non-interfering waveform placement. The waveform placement process may be configured for any of numerous types of waveforms including, for example, orthogonal frequency division multiplexed (OFDM) waveforms. Using embodiments of the waveform placement process discussed herein, a wireless device may scan a selected frequency band and either join an existing network or establish a network in a non-interfering location that can be joined by other cooperative wireless devices. The wireless device may implement these functions without a-priori knowledge or pre-programming of either like networks (i.e., those networks with characteristics the same as or similar to the characteristics of the network the wireless device expects to communicate with) or existing RF emitters in the specified RF frequency band.

Figure 9:
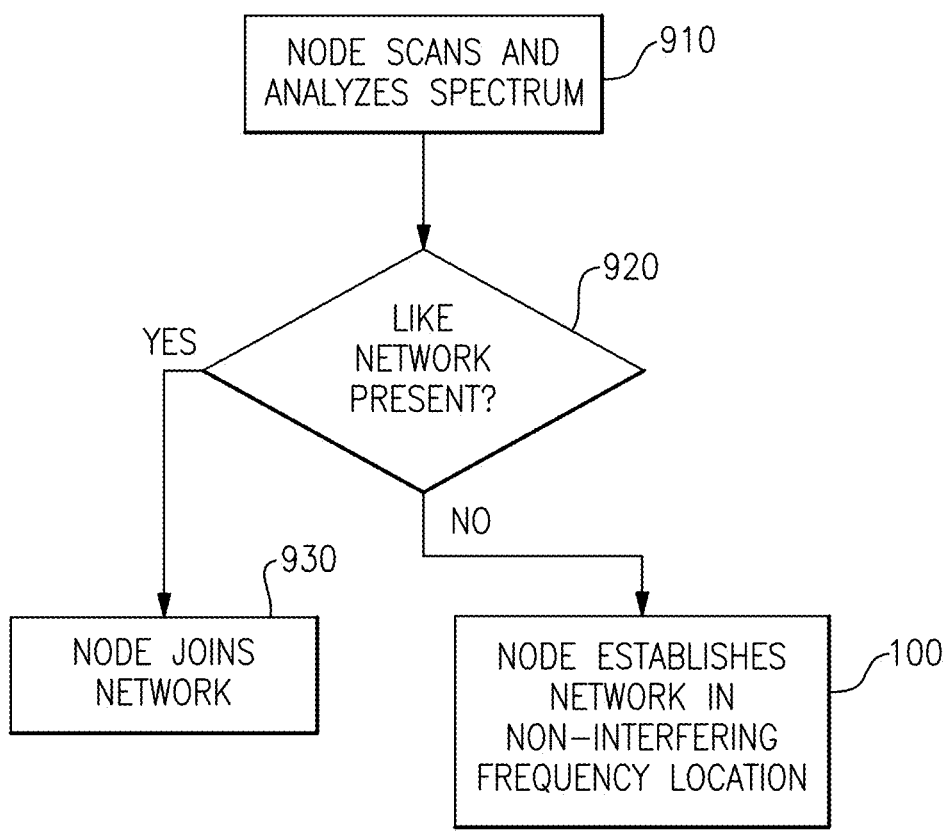
FIG. 9 is a flow diagram illustrating one example of a network discovery and dynamic spectrum access process according to aspects of the invention.

Referring to FIG. 9, there is illustrated a flow diagram of one example of a network discovery and dynamic spectrum access process according to one embodiment. In step 910 the wireless device (node) scans and analyzes a selected frequency band of potential operation to determine whether a like network is present (step 920). This step 920 may also include step 105 of scanning and analyzing the frequency band for non-cooperative RF signals, as discussed above. If the node finds a like network, the node may join that existing network (step 930). If the node determines that a like network is not already present in the selected frequency band, the node may establish a network according to the waveform placement process 100 discussed above.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of establishing a wireless network, the method comprising acts of:
    scanning and analyzing a selected frequency band to detect non-cooperative signals within the selected frequency band;
    determining whether a waveform including a plurality of radio frequency (RF) carriers and a plurality of intermodulation tones can be placed within the selected frequency band without interfering with any detected non-cooperative signals, the act of determining including acts of selecting at least one frequency for at least one intermodulation tone of the plurality of intermodulation tones, placing the at least one intermodulation tone at the at least one frequency in the waveform, and evaluating interference with the any detected non-cooperating signals based on placing the at least one intermodulation tone in the waveform;
    selecting transmit frequencies for the plurality of RF carriers responsive to obtaining a non-interfering waveform placement solution; and
    transmitting the waveform using the selected transmit frequencies for the plurality of RF carriers and the at least one frequency for the at least one first intermodulation tone to establish the wireless network.

2. The method of claim 1, wherein determining whether the waveform can be placed within the selected frequency band includes:
    selecting a first transmit frequency for one of the plurality of RF carriers; and
    evaluating interference with the any detected non-cooperating signals based on placing the waveform with the one of the plurality of RF carriers transmitted at the first transmit frequency.

3. The method of claim 1, wherein the act of selecting at least one frequency for at least one intermodulation tone includes:
    selecting a first frequency for a first intermodulation tone of the plurality of intermodulation tones; and
    selecting a second frequency for a second intermodulation tone of the plurality of intermodulation tones; and
    wherein the act of evaluating includes evaluating interference with the any detected non-cooperating signals based on placing the first intermodulation tone at the first frequency in the waveform and the second intermodulation tone at the second frequency in the waveform.

4. The method of claim 3, wherein the plurality of RF carriers consists of two RF carriers, and wherein the first intermodulation tone is a fifth-order intermodulation tone and the second intermodulation tone is a third-order intermodulation tone.

5. The method of claim 4, wherein selecting the first frequency for the first intermodulation tone includes placing the first intermodulation tone to the right of a first detected non-cooperative signal, the first detected non-cooperative signal having a lowest frequency of the any detected non-cooperative signals.

6. The method of claim 4, wherein selecting the second frequency for the second intermodulation tone includes:
    determining whether the second intermodulation tone can be accommodated in a location to the right of the first non-cooperative signal and to the left of a next non-cooperative signal;
    placing the second intermodulation tone to the right of the first intermodulation tone responsive to determining that the second intermodulation tone can be accommodated in the location; and
    placing the second intermodulation tone to the right of a next non-cooperative signal where there exists a gap sufficient to maintain a minimum channel spacing between the second intermodulation tone and the any detected non-cooperative signals responsive to determining that the second intermodulation tone cannot be accommodated in the location.

7. The method of claim 3, further comprising iteratively repeating selecting the first frequency and selecting the second frequency responsive to the evaluating interference step revealing that placing the waveform with the first intermodulation tone at the first frequency and the second intermodulation tone at the second frequency would result in interference with the any detected non-cooperative signals.

8. The method of claim 1, further comprising reducing a number of RF carriers in the plurality of RF carriers in the waveform responsive to determining that the waveform can not be placed within the selected frequency band without interfering with the any detected non-cooperative signals.

9. The method of claim 8, wherein the plurality of RF carriers consists of two RF carriers and reducing the number of RF carriers in the plurality of RF carriers includes reducing the number to one RF carrier.

10. The method of claim 9, further comprising:
placing the one RF carrier at a transmit frequency within the selected frequency band where the one RF carrier does not interfere with the any detected non-cooperative signals; and
transmitting the one RF carrier at the transmit frequency.

11. The method of claim 10, wherein placing the one RF carrier includes selecting the transmit frequency within a largest frequency spacing between any two of the any detected non-cooperative signals.

12. A wireless device configured to implement a dynamic spectrum access method, the wireless device comprising:
a transmitter configured to transmit a waveform; and
a controller coupled to the transmitter and configured to:
direct the wireless device to scan a selected frequency band;
analyze the selected frequency band responsive to the scan to detect non-cooperative signals within the selected frequency band;
determine whether the waveform including a plurality of radio frequency (RF) carriers and a plurality of intermodulation tones can be placed within the selected frequency band without interfering with any detected non-cooperative signals; and
select transmit frequencies for the plurality of RF carriers responsive to obtaining a non-interfering waveform placement solution,
wherein in determining whether the waveform can be placed within the selected frequency band, the controller is further configured to select at least one frequency for at least one intermodulation tone of the plurality of intermodulation tones, place the at least one intermodulation tone at the at least one frequency in the waveform, and evaluate interference with the any detected non-cooperating signals based on placing the at least one intermodulation tone in the waveform.

13. The wireless device of claim 12, wherein the wireless device is a radio.

14. The wireless device of claim 12 wherein, in selecting at least one frequency for at least one intermodulation tone, the controller is further configured to:
select a first frequency for a first intermodulation tone of the plurality of intermodulation tones; and
select a second frequency for a second intermodulation tone of the plurality of intermodulation tones; and
wherein in evaluating interference, the controller is further configured to evaluate interference with the any detected non-cooperating signals based on the wireless device transmitting the waveform with the first intermodulation tone located at the first frequency in the waveform and the second intermodulation tone located at the second frequency in the waveform.

15. The wireless device of claim 14, wherein the plurality of RF carriers consists of two RF carriers, and wherein the first intermodulation tone is a fifth-order intermodulation tone and the second intermodulation tone is a third-order intermodulation tone.

16. The wireless device of claim 12, further comprising a user interface, and wherein the controller is configured to direct the user interface to display the non-interfering waveform placement solution for selection by a user.

17. The wireless device of claim 12, wherein the controller is further configured to reduce a number of RF carriers in the plurality of RF carriers in the waveform responsive to determining that the waveform can not be placed within the selected frequency band without interfering with the any detected non-cooperative signals.

18. A method of dynamic spectrum access comprising:
scanning a frequency band to detect non-cooperative signals within the frequency band; and
determining at least one waveform placement solution to place a radio frequency (RF) waveform within the frequency band without any waveform segments of the RF waveform interfering with any detected non-cooperative signals, including:
selecting a first configuration of the RF waveform that includes a plurality of waveform segments including at least two RF carriers and a plurality of intermodulation tones;
evaluating interference between the plurality of waveform segments and the any detected non-cooperative signals and providing an interference report;
providing a waveform placement solution corresponding to the first configuration of the RF waveform responsive to the interference report indicating no interference between the plurality of waveform segments and the any detected non-cooperative signals, the waveform placement solution including a transmit frequency of the at least two RF carriers;
selecting a second configuration of the RF waveform responsive to the interference report indicating interference between a waveform segment of the plurality of waveform segments and any one of the any detected non-cooperative signals, the second configuration of the RF waveform including at least one waveform segment; and
evaluating interference between the at least one waveform segment and the any detected non-cooperative signals.

19. The method of claim 18, further comprising:
receiving a user input; and
selecting at least one of the first and second configurations of the RF waveform responsive to the user input.

20. A wireless device configured to implement a dynamic spectrum access method, the wireless device comprising:
a user interface;
a transmitter configured to transmit a waveform; and
a controller coupled to the transmitter and configured to:
direct the wireless device to scan a selected frequency band;
analyze the selected frequency band responsive to the scan to detect non-cooperative signals within the selected frequency band;
determine whether the waveform including a plurality of radio frequency (RF) carriers and a plurality of intermodulation tones can be placed within the selected frequency band without interfering with any detected non-cooperative signals;
select transmit frequencies for the plurality of RF carriers responsive to obtaining a non-interfering waveform placement solution; and
direct the user interface to display the non-interfering waveform placement solution for selection by a user.

\* \* \* \* \*